(12) United States Patent
Jabbour

(10) Patent No.: US 10,055,007 B2
(45) Date of Patent: Aug. 21, 2018

(54) ENERGY RESERVE CONSERVATION FOR VEHICLE COMMUNICATION MODULE

(71) Applicant: GM GLOBAL TECHNOLOGY OPERATIONS LLC, Detroit, MI (US)

(72) Inventor: Carlos S. Jabbour, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 274 days.

(21) Appl. No.: 14/676,623

(22) Filed: Apr. 1, 2015

(65) Prior Publication Data

US 2016/0291684 A1    Oct. 6, 2016

(51) Int. Cl.
*G06F 1/32* (2006.01)
*G06F 13/40* (2006.01)

(52) U.S. Cl.
CPC ........ *G06F 1/3296* (2013.01); *G06F 13/4027* (2013.01); *Y02D 10/14* (2018.01); *Y02D 10/151* (2018.01)

(58) Field of Classification Search
CPC .................................................... G06F 1/3296
See application file for complete search history.

(56) References Cited

U.S. PATENT DOCUMENTS

| | | | |
|---|---|---|---|
| 2009/0309745 A1* | 12/2009 | Johnson | G06F 1/26 340/635 |
| 2011/0055133 A1* | 3/2011 | Gee | A61B 5/0015 706/46 |

* cited by examiner

*Primary Examiner* — Kim Huynh
*Assistant Examiner* — Eric Chang
(74) *Attorney, Agent, or Firm* — Lorenz & Kopf, LLP

(57) ABSTRACT

Methods and systems for conserving reserve energy for a communication module for a vehicle are provided. The occurrence of an event is detected. The communication module is placed in a first mode upon the detection of the event. The communication module is placed in a second mode after the communication module has been in the first mode for a predetermined amount of time. The first mode comprises an energy reserve conservation mode that uses less energy than the second mode.

20 Claims, 2 Drawing Sheets

ENERGY RESERVE CONSERVATION FOR VEHICLE COMMUNICATION MODULE

TECHNICAL FIELD

The present disclosure generally relates to vehicles, and more particularly relates to methods and systems for energy reserve conservation for communication modules for vehicles.

BACKGROUND

Many vehicles today have communication modules that monitor communication buses and relay messages from one vehicle module to another. However, when a vehicle event occurs resulting in power loss, there may be limited available energy reserve for the communication module to relay the messages.

Accordingly, it is desirable to provide techniques for energy reserve conservation for communication modules for vehicles, for example that can potentially improve the ability for communication modules to relay certain messages after a vehicle event has occurred. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a method is provided for controlling a communication module for a vehicle. The method comprises detecting an occurrence of an event, placing the communication module in a first mode upon the detection of the event, and placing the communication module in a second mode after the communication module has been in the first mode for a predetermined amount of time, wherein the first mode comprises an energy reserve conservation mode that uses less energy than the second mode.

In accordance with an exemplary embodiment, a system is provided for controlling a communication module for a vehicle. The system comprises a detection unit and a processor. The detection unit is configured to at least facilitate detecting an occurrence of an event. The processor is coupled to the detection unit, and is configured to at least facilitate placing the communication module in a first mode upon the detection of the event, and placing the communication module in a second mode after the communication module has been in the first mode for a predetermined amount of time, wherein the first mode comprises an energy reserve conservation mode that uses less energy than the second mode.

In accordance with a further exemplary embodiment, a vehicle is provided. The vehicle comprises a vehicle module, a communication module, and one or more communication networks. The vehicle module is configured to transmit a message along a communication bus. The communication module is coupled to the vehicle module, and comprises a detection unit, a transceiver, and a processor. The detection unit configured to at least facilitate detecting an occurrence of an event. The transmitter is configured to at least facilitate relaying a received message. The processor is coupled to the detection unit, and is configured to at least facilitate placing the communication module in a low power mode upon the detection of the event, the low power mode comprising an energy reserve conservation mode, in which the transmitter does not relay the message, and placing the communication module in an active mode, in which the transmitter relays the message, after the communication module has been in the low power mode for a predetermined amount of time.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
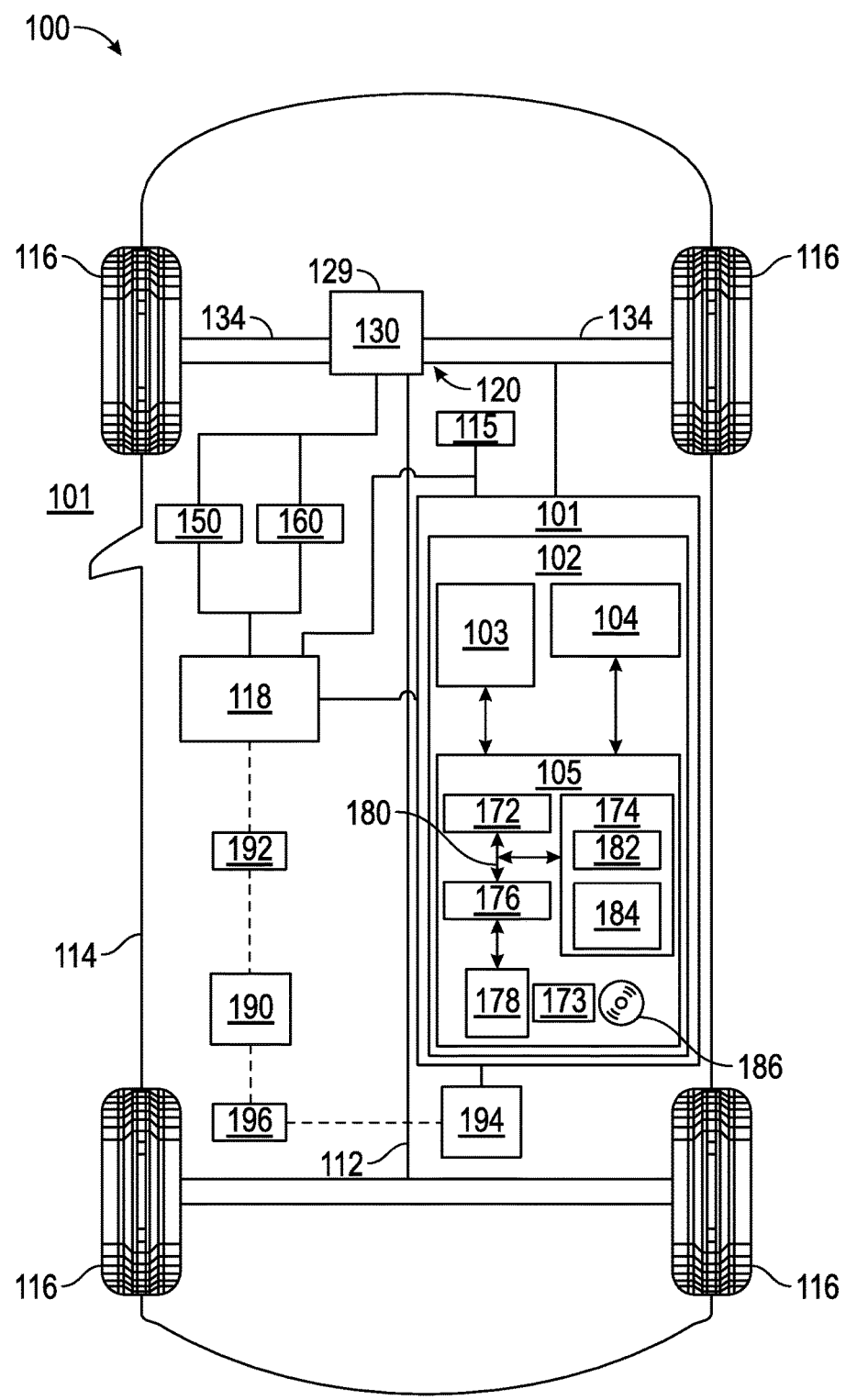
FIG. 1 is a functional block diagram of a vehicle that includes a communication module with a reserve energy conservation functionality, in accordance with an exemplary embodiment.

FIG. 1 illustrates a vehicle 100, or automobile, according to an exemplary embodiment. As described in greater detail further below, the vehicle 100 includes a communication module 101 and a control system 102 for conserving reserve energy for the communication module 101. As discussed further below, the communication module 101 monitors messages from and between various vehicle modules along multiple communication buses, including the first vehicle module 190, the second vehicle module 194, the first communication bus 192, and the second communication bus 196. Also as discussed further below, the communication module 101 is selectively placed in a first mode (e.g., low-power mode) by the control system 102 after a vehicle event has occurred, and is subsequently placed in a second mode (e.g. active mode) by the control system 102 a predetermined amount of time thereafter, in accordance with the steps of the process 200 discussed further below in connection with FIG. 1. Also as discussed below, the control system 102 includes a detection unit 103, a transceiver 104, and a controller 105 as depicted in FIG. 1.

As depicted in FIG. 1, the vehicle 100 includes, in addition to the above-referenced communication module 101, control system 102, vehicle modules 190, 194, and communication buses 192, 196, a body 114, a battery (or energy storage system) 115, four wheels 116, an electronic control system 118, a steering system 150, and a braking system 160. The body 114 is arranged on the chassis 112 and substantially encloses the other components of the vehicle 100. The body 114 and the chassis 112 may jointly form a frame. The battery 115 is used to power the communication module 101 as well as various other vehicle systems. The wheels 116 are each rotationally coupled to the chassis 112 near a respective corner of the body 114. In various embodiments the vehicle 100 may differ from that depicted in FIG. 1. For example, in certain embodiments the number of wheels 116 may vary. By way of additional example, in various embodiments the vehicle 100 may not have a steering system, and for example may be steered by differential braking, among various other possible differences.

In the exemplary embodiment illustrated in FIG. 1, the vehicle 100 includes an actuator assembly 120. The actuator assembly 120 includes at least one propulsion system 129 mounted on the chassis 112 that drives the wheels 116. In the depicted embodiment, the actuator assembly 120 includes an engine 130. In one embodiment, the engine 130 comprises a combustion engine. In other embodiments, the actuator assembly 120 may include one or more other types of engines and/or motors, such as an electric motor/generator, instead of or in addition to the combustion engine.

Still referring to FIG. 1, the engine 130 is coupled to at least some of the wheels 116 through one or more drive shafts 134. In some embodiments, the engine 130 is mechanically coupled to the transmission. In other embodiments, the engine 130 may instead be coupled to a generator used to power an electric motor that is mechanically coupled to the transmission. In certain other embodiments (e.g. electrical vehicles), an engine and/or transmission may not be necessary.

The steering system 150 is mounted on the chassis 112, and controls steering of the wheels 116. The steering system 150 includes a steering wheel and a steering column (not depicted). The steering wheel receives inputs from a driver of the vehicle 100. The steering column results in desired steering angles for the wheels 116 via the drive shafts 134 based on the inputs from the driver. Similar to the discussion above regarding possible variations for the vehicle 100, in certain embodiments the vehicle 100 may not include a steering wheel and/or steering. In addition, in certain embodiments, an autonomous vehicle may utilize steering commands that are generated by a computer, with no involvement from the driver.

The braking system 160 is mounted on the chassis 112, and provides braking for the vehicle 100. The braking system 160 receives inputs from the driver via a brake pedal (not depicted), and provides appropriate braking via brake units (also not depicted). The driver also provides inputs via an accelerator pedal (not depicted) as to a desired speed or acceleration of the vehicle, as well as various other inputs for various vehicle devices and/or systems, such as one or more vehicle radios, other entertainment systems, environmental control systems, lighting units, navigation systems, and the like (also not depicted). Similar to the discussion above regarding possible variations for the vehicle 100, in certain embodiments steering, braking, and/or acceleration can be commanded by a computer instead of by a driver.

As noted above, the communication module 101 monitors messages from and between various vehicle modules along multiple communication buses, including the first vehicle module 190, the second vehicle module 194, the first communication bus 192, and the second communication bus 196. In various embodiments, the communication module 101 monitors and relays, as appropriate, periodic and/or asynchronous messages from or between the vehicle modules 190, 194 and/or communication buses 192, 196 after an event has occurred that results in a power loss, such as a rapid drop in voltage from the battery 115 of the vehicle 100.

In one embodiment, the first vehicle module 190 comprises an airbag deployment module that transmits messages along the first communication bus 192 when airbags are deployed within the vehicle 100. Also in one embodiment, the second vehicle module 194 comprises a communications system that transmits messages using a second communication bus 196 that ultimately are received by a central server remote from the vehicle when assistance is needed, for example to a call center that can call the appropriate authorities and/or provide other assistance during a vehicle event (e.g. in which the airbags have been deployed). In this example, the communication module 101 functions between the vehicle modules 190, 194 in relaying the messages from the first vehicle module 190 to the second vehicle module 194 (e.g., in alerting the appropriate authorities when an event has occurred in which the airbags have been deployed). It will be appreciated that this may vary in certain embodiments. For example, the communication module 101 may function with any number of different types of vehicle modules and/or communication buses in various embodiments.

As depicted in FIG. 1, the communication module 101 is controlled via a control system 102 having a detection unit 103, a transceiver 104, and a controller 105. As depicted in FIG. 1, in certain embodiments the controller 105 is part of the communication module 101, and for example may reside in the same housing as the communication module 101. In other embodiments, the controller 105, and/or one or more components thereof, may be separate from, and/or may reside in a separate housing from, the communication module 101.

The detection unit 103 collects data for determining whether a vehicle event has occurred. In certain embodiments, the detection unit 103 comprises one or more sensors for determining whether an event (such as a collision) has occurred that may result in power loss for the communication module 101. In one embodiment, the detection unit 103 comprises one or more voltage sensors for measuring voltage values from the battery 115 of the vehicle 100 over time. The measurements and information from the various sensors of the detection unit 103 are provided to the controller 105 for processing. It will be appreciated that in certain embodiments in which the controller 105 may be separate from the communication module 101, that the detection unit 103 may be part of the communication module 101 and separate from the control system 102, and so on.

The transceiver 104 is configured to monitor vehicle communication buses and relay messages from the vehicle 100. In one embodiment, the transceiver monitors the first and second communication buses 192, 196 for periodic and/or asynchronous messages from or between the first and second vehicle modules 190, 194 during ordinary operation of the vehicle 100, as well as during or after a vehicle event that may result in loss of power. It will be appreciated that in certain embodiments in which the controller 105 may be separate from the communication module, that the transceiver 104 may be part of the communication module 101 and separate from the control system 102, and so on.

The controller 105 is coupled to the detection unit 103 and the transceivers 104. In addition, in various embodiments, the controller 105 is also coupled to the communication module 101 and/or components thereof (e.g., in embodiments in which the controller 105 may be part of a separate system), and to the various vehicle modules (e.g., the first vehicle module 190 and the second vehicle module 194) and/or communication buses (e.g. the first communication bus 192 and the second communication bus 196). The controller 105 controls the communication module 101, including by selectively placing the communication module 101 in (A) a first mode (also referred to herein as a "low-power mode"), in which reserve energy is conserved for the communication module 101 and the communication module 101 does not monitor communication buses and relay messages; and (B) a second mode (also referred to herein as a "active mode"), in which reserve energy is utilized and the communication module 101 monitors communication buses and relays messages. The controller 105, along with the other components of the control system 102, provides these and other functions in accordance with the process 200 described further below in connection with FIG. 2.

As depicted in FIG. 1, the controller 105 comprises a computer system. In certain embodiments, the controller 105 may also include one or more of the sensors of the detection unit 103, one or more transceivers 104, one or more other devices and/or systems, and/or components thereof. In addition, it will be appreciated that the controller 105 may otherwise differ from the embodiment depicted in FIG. 1. For example, the controller 105 may be coupled to or may otherwise utilize one or more remote computer systems and/or other control systems, such as the electronic control system 118 of FIG. 1.

In the depicted embodiment, the computer system of the controller 105 includes a processor 172, a timer 173, a memory 174, an interface 176, a storage device 178, and a bus 180. The processor 172 performs the computation and control functions of the controller 105, and may comprise any type of processor or multiple processors, single integrated circuits such as a microprocessor, or any suitable number of integrated circuit devices and/or circuit boards working in cooperation to accomplish the functions of a processing unit. During operation, the processor 172 executes one or more programs 182 contained within the memory 174 and, as such, controls the general operation of the controller 105 and the computer system of the controller 105, generally in executing the processes described herein, such as the process 200 described further below in connection with FIG. 2. In certain embodiments, various other, non-software based implementations may be utilized, such as an Application Specific Integrated Circuit and/or a Field Programmable Gate Array (FPGA).

The timer 173 keeps track of a predetermined amount of time for which the communication module 101 is placed in the low-power mode, after which the communication module 101 is automatically returned to the active mode, for example as described further below in accordance with the steps of the process 200 of FIG. 2. In one embodiment, the timer 173 is part of the communication module 101, and is controlled by the processor 172. The placement of the timer 173 may vary in certain embodiments. For example, in certain embodiments, the timer 173 may be part of the communication module 101 and separate from the controller 105. In other embodiments, the timer 173 may be part of the controller 105 and separate from the communication module 101. In yet other embodiments, the timer 173 may be part of both the controller 105 and the communication module 101.

The memory 174 can be any type of suitable memory. For example, the memory 174 may include various types of dynamic random access memory (DRAM) such as SDRAM, the various types of static RAM (SRAM), and the various types of non-volatile memory (PROM, EPROM, and flash). In certain examples, the memory 174 is located on and/or co-located on the same computer chip as the processor 172. In the depicted embodiment, the memory 174 stores the above-referenced program 182 along with one or more stored values 184 (e.g., a predetermined amount of time for the timer 173, by way of example).

The bus 180 serves to transmit programs, data, status and other information or signals between the various components of the computer system of the controller 105. The interface 176 allows communication to the computer system of the controller 105, for example from a system driver and/or another computer system, and can be implemented using any suitable method and apparatus. In one embodiment, the interface 176 obtains the various data from the sensors of the detection unit 103. The interface 176 can include one or more network interfaces to communicate with other systems or components. The interface 176 may also include one or more network interfaces to communicate with technicians, and/or one or more storage interfaces to connect to storage apparatuses, such as the storage device 178.

The storage device 178 can be any suitable type of storage apparatus, including direct access storage devices such as hard disk drives, flash systems, floppy disk drives and optical disk drives. In one exemplary embodiment, the storage device 178 comprises a program product from which memory 174 can receive a program 182 that executes one or more embodiments of one or more processes of the present disclosure, such as the steps of the process 200 (and any sub-processes thereof) described further below in connection with FIG. 2. In another exemplary embodiment, the program product may be directly stored in and/or otherwise accessed by the memory 174 and/or a disk (e.g., disk 186), such as that referenced below.

The bus 180 can be any suitable physical or logical means of connecting computer systems and components. This includes, but is not limited to, direct hard-wired connections, fiber optics, infrared and wireless bus technologies. During operation, the program 182 is stored in the memory 174 and executed by the processor 172.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 172) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 105 may also otherwise differ from the embodiment depicted in FIG. 1, for example in that the computer system of the controller 105 may be coupled to or may otherwise utilize one or more remote computer systems and/or other control systems.

While the control system 102, the sensor array 103, and the controller 105 are depicted as being part of the same system, it will be appreciated that in certain embodiments these features may comprise two or more systems. In addition, in various embodiments the control system 102 may comprise all or part of, and/or may be coupled to, the communication module 101 and/or various other vehicle devices and systems, such as, among others, the actuator assembly 120, and/or the electronic control system 118.

Figure 2:
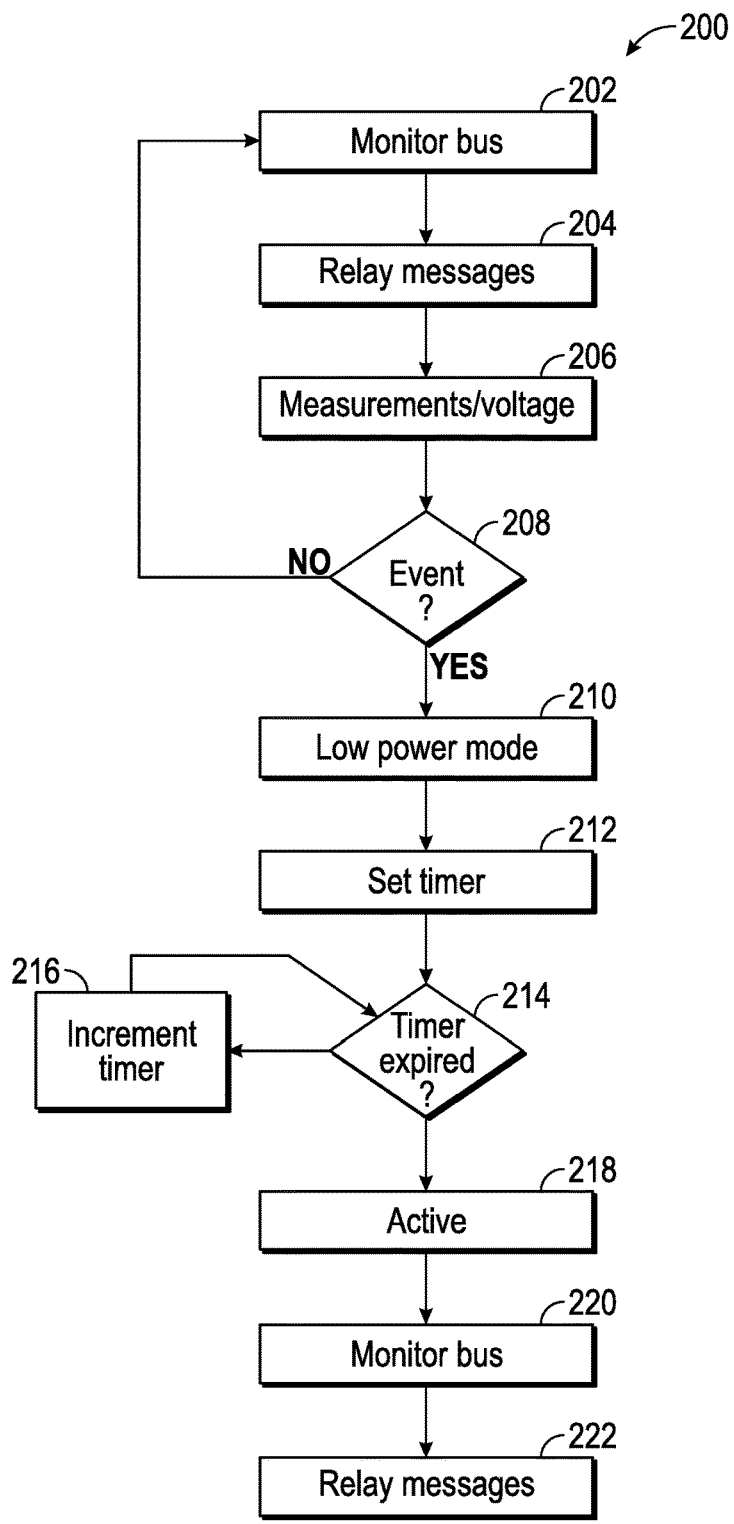
FIG. 2 is a flowchart of a process for controlling a communication module, and that can be used in conjunction with the vehicle and the communication module of FIG. 1, in accordance with an exemplary embodiment.

FIG. 2 is a flowchart of a process 200 for controlling a communication module, in accordance with an exemplary embodiment. The process 200 can be used in conjunction with the vehicle 100 and the communication module 101 of FIG. 1, also in accordance with an exemplary embodiment. In one embodiment, the process 200 is performed, preferably continuously, throughout a vehicle ignition or drive cycle in which the vehicle is driven.

As depicted in FIG. 2, the process 200 includes the step of monitoring a communication bus (step 202). In various embodiments, the communication module 101 of FIG. 1 monitors various communication buses of the vehicle 100, including the first communication bus 192 of FIG. 1. In one embodiment, the communication module 101 monitors the communication busses at least for periodic messages (e.g., messages that would be repeated on a periodic basis). In addition, the communication module 101 is in the above-described "active mode" during step 202.

Messages are relayed as appropriate (step 204). In various embodiments, the communication module 101 of FIG. 1 relays various messages from one communication bus to another via the transceiver 104, so that the detected messages are forwarded to the intended recipients. For example, in one embodiment, the communication module 101 relays messages of the first vehicle module 190 (e.g., an airbag deployment module) from the first communication bus 192 of FIG. 1 to the second communication bus 196 so that the messages can be received by the second vehicle module 194 as intended (e.g. for forwarding to a remote call center for assistance). In certain embodiments, the communication module 101 may also transmit the messages directly or indirectly outside the vehicle (e.g. to a remote call center) via the transceiver 104.

Measurements are obtained pertaining to a possible vehicle event (step 206). In one embodiment, data is obtained by the detection unit 103 of FIG. 1 pertaining to a possible power loss and/or collision for the vehicle. In one embodiment, voltage data for the battery 115 of the vehicle 100 is measured by one or more voltage sensors of the detection unit 103 that are coupled to the battery 115 or a system of the battery 115. Also in one embodiment, the measurements are provided to the processor 172 for processing.

A determination is made as to whether a particular type of vehicle event has occurred (step 208). In one embodiment, a determination is made as to whether a vehicle collision has occurred and/or a vehicle event pertaining to a power loss has occurred. In one embodiment, a determination is made as to whether a sudden loss in voltage has occurred for the battery 115 of the vehicle 100. For example, in one such embodiment, a sudden loss of voltage would be deemed to occur if the battery's voltage dropped to a level below a threshold, such as 5 volts, within a predefined number of samples, such as one (e.g. from one sampling of voltage measurement to the next subsequent voltage measurement) and/or within a predetermined amount of time (e.g. within fifty milliseconds). However, this may vary in other embodiments. In one embodiment, the determination of step 208 is made by the processor 172 of FIG. 1 using the information obtained in step 206 from the detection unit 103 of FIG. 1. In another embodiment, the determination of step 208 is made by the detection unit 103 itself.

If it is determined in step 208 that the particular type of vehicle event has not occurred, then the process returns to step 202. The communication module 101 remains in the active mode, and the process repeats in a new iteration beginning with step 202.

Conversely, if it is determined in step 208 that the particular type of vehicle event has occurred, then the communication module 101 is put in the above-referenced low-power mode (step 210). While in the low-power mode, the communication module 101 performs minimal functionality in order to conserve reserve energy. In one embodiment, while in the low-power mode, the transceiver 104 is turned off, and the communication module 101 does not monitor the communication buses nor relay messages. In one embodiment, the communication module 101 is placed and maintained in the low-power mode by the processor 172 of FIG. 1.

The communication module is kept in the low-power mode of step 210 for a predetermined amount of time, regardless of external circumstances. Specifically, in one embodiment, the communication module 101 is "put to sleep" for a predetermined number of milliseconds, and is then automatically "woken up" (i.e. placed back into the active mode) by the processor 172 of FIG. 1 after the predetermined number of milliseconds has expired. In one embodiment, the predetermined amount of time is equal to approximate one hundred and fifty milliseconds (150 ms). However, this may vary in other embodiments.

In the depicted embodiment, this is accomplished by setting the above-discussed timer 173 of FIG. 1 (step 212). While the communication module 101 remains in the low-power mode, periodic checks are determined as to whether the timer has expired (step 214), and the timer is periodically incremented (step 216). So long as the timer has not expired (i.e. so long as the predetermined amount of time has not elapsed), steps 214 and 216 continue to repeat. In one embodiment, these steps are performed by the processor 172 of FIG. 1.

Once the timer has elapsed or expired (i.e. once the predetermined amount of time has elapsed), the communication module 101 is returned to the active mode (step 218). In one embodiment, this is performed via instructions provided by the processor 172 of FIG. 1. Once in the active mode, the communication module 101 continues to monitor the communication buses (step 220) and relay messages as appropriate (step 222), similar to the discussion above with respect to steps 202 and 204, respectively. For example, in one such embodiment, the communication module 101 monitors periodic messages such as those from an airbag deployment module, and then relays the messages accordingly while in the active mode.

The disclosed methods, systems, and vehicles can provide for potentially improved use of reserve energy and for potentially improved monitoring and relaying of messages in the case of a vehicle event. By way of example, suppose there is two hundred milliseconds (200 ms) worth of reserve energy during or after a vehicle event. Using traditional techniques a communication module would only be able to relay messages that were transmitted within the first 200 ms after the event. However, using the communication system 101 of FIG. 1 (using the process 200 of FIG. 2) would potentially be able to relay periodic messages for a longer window. For example, if the communication module 101 were put to sleep for one hundred fifty milliseconds (150 ms) once the event is detected, then the communication module 101 would be able to relay periodic messages that were transmitted up to three hundred fifty milliseconds (350 ms) after the event. This would be possible due to the fact that the 200 ms of reserve energy would be utilized after the first 150 ms have elapsed. In addition, the communication module 101 would also receive periodic messages that began very soon after the event occurred (e.g., the first 150 ms), because such periodic messages would also be repeated during the window in which the communication module 101 is in the active mode.

It will be appreciated that the disclosed methods, systems, and vehicles may vary from those depicted in the Figures and described herein. For example, the vehicle 100, the communication module 101, the control system 102, and/or various components thereof may vary from that depicted in FIG. 1 and described in connection therewith. In addition, it will be appreciated that certain steps of the process 200 may vary from those depicted in FIG. 2 and/or described above in connection therewith. It will similarly be appreciated that certain steps of the method described above may occur simultaneously or in a different order than that depicted in FIG. 2 and/or described above in connection therewith.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the appended claims and the legal equivalents thereof.

What is claimed is:

1. A method of controlling a communication module for a vehicle having a vehicle communication bus and a processor, the method comprising:
   detecting an occurrence of a vehicle event pertaining to the vehicle;
   via the processor, placing the communication module in a first mode, in which the communication module conserves energy, does not monitor the vehicle communication bus, and does not relay event-related messages from the vehicle communication bus, upon the detection of the vehicle event; and
   via the processor, placing the communication module in a second mode, in which the communication module monitors the vehicle communication bus and relays one or more event-related messages from the vehicle communication bus, after the communication module has been in the first mode for the predetermined amount of time, wherein the first mode comprises an energy reserve conservation mode that uses less energy than the second mode, such that:
      the communication module is unable to relay event-related messages while the communication module is in the first mode; and
      the communication module is configured to relay event-related messages while the communication module is in the second mode.

2. The method of claim 1, further comprising:
   relaying event-related messages from a first communication bus to a second vehicle communication bus via the communication module when the communication module is in the active mode, but not when the communication module is in the low-power mode.

3. The method of claim 1, wherein the vehicle has an airbag deployment module, and the method further comprises:
   relaying an event-related message regarding the vehicle event from the airbag deployment module via the communication module when the communication module is in the active mode, but not when the communication module is in the low-power mode.

4. The method of claim 1, wherein:
   the step of detecting the occurrence of the vehicle event comprises determining if a power loss has occurred; and
   the step of placing the communication module in the first mode comprises placing the communication module in the first mode upon the detection that the power loss has occurred.

5. The method of claim 1, wherein the vehicle comprises a battery, and the method further comprises:
   measuring a voltage of the battery;
   wherein:
      the step of detecting the occurrence of the vehicle event comprises determining if a sudden voltage drop has occurred; power loss has occurred; and
      the step of placing the communication module in the first mode comprises placing the communication module in the first mode upon the detection that the sudden voltage drop has occurred.

6. The method of claim 1, further comprising:
   setting an internal timer for the communication module when the communication module is placed in the first mode;
   wherein the step of placing the communication module in the second mode comprises automatically placing the communication module in the second mode after the internal timer has reached the predetermined amount of time.

7. The method of claim 1, wherein:
   the step of detecting an occurrence comprises:
      detecting when a vehicle collision has occurred for the vehicle;
   the step of placing the communication module in the first mode comprises:
      upon detecting the vehicle collision, placing the communication module in the first mode, in which the communication module cannot relay event-related messages, but in which the communication module stores power to relay, at a future point in time, an event-related collision message regarding the vehicle collision;
   the step of placing the communication module in the second mode comprises:
      after the communication module has been in the first mode for a predetermined amount of time, placing the communication module in the second mode, in which the communication module can relay the event-related collision message; and
   the method further comprises:
      relaying the event-related collision message via the communication module, after the communication module is placed in the second mode.

8. The method of claim 1, wherein the predetermined amount of time corresponds to an expected amount of time that is expected to have elapsed following the vehicle event until a particular one of the event-related messages are first provided on the vehicle communication bus.

9. The method of claim 1, wherein the predetermined amount of time corresponds to an expected amount of time that is expected to have elapsed following the vehicle event until an airbag deployment system message is first provided on the vehicle communication bus.

10. The method of claim 1, wherein the communication module conserves energy while in the first mode such that the communication module maintains a sufficient amount of energy after the predetermined amount of time to relay the one or more event-related messages after the one or more event-related messages are first provided on the vehicle communication bus.

11. The method of claim 1, wherein the predetermined amount of time is equal to approximately one hundred and fifty milliseconds (150 ms).

12. A system for controlling a communication module for a vehicle having a vehicle communication bus and a processor, the system comprising:
   a detection unit configured to at least facilitate detecting an occurrence of a vehicle event pertaining to the vehicle; and
   a processor coupled to the detection unit and configured to at least facilitate:
      placing the communication module in a first mode, in which the communication module conserves energy, does not monitor the vehicle communication bus, and does not relay event-related messages from the vehicle communication bus, upon the detection of the vehicle event; and
      placing the communication module in a second mode, in which the communication module monitors the vehicle communication bus and relays one or more event-related messages from the vehicle communication bus, after the communication module has been in the first mode for the predetermined amount of time, wherein the first mode comprises an energy reserve conservation mode that uses less energy than the second mode, such that:
         the communication module is unable to relay event-related messages while the communication module is in the first mode; and
         the communication module is configured to relay event-related messages while the communication module is in the second mode.

13. The system of claim 12, wherein the communication module relays event-related messages from a first vehicle communication bus to a second vehicle communication bus when in the active mode, but not when in the low-power mode.

14. The system of claim 12, wherein the vehicle has an airbag deployment module, and the communication module relays an event-related message regarding the vehicle event from the airbag deployment module when the communication module is in the active mode, but not when the communication module is in the low-power mode.

15. The system of claim 12, wherein:
   the vehicle comprises a battery;
   the detection unit comprises a sensor configured to measure a voltage of the battery over time; and
   the processor is configured to at least facilitate:
      determining if a sudden voltage drop has occurred based on the voltage of the battery over time; and
      placing the communication module in the first mode upon the detection that the sudden voltage drop has occurred.

16. The system of claim 12, wherein the processor is further configured to at least facilitate:
   setting an internal timer for the communication module when the communication module is placed in the first mode; and
   automatically placing the communication module in the second mode after the internal timer has reached the predetermined amount of time.

17. A vehicle comprising:
   a communication bus;
   a vehicle module configured to transmit an event-related message along the vehicle communication bus upon an occurrence of a vehicle event; and
   a communication module coupled to the vehicle module, the communication module comprising:
      a detection unit configured to at least facilitate detecting an occurrence of the vehicle event;
      a transmitter configured to at least facilitate relaying the message; and
      a processor coupled to the detection unit and configured to at least facilitate:
         placing the communication module in a low-power mode, in which the communication module conserves energy, does not monitor the vehicle communication bus, and does not relay the event-related message from the vehicle communication bus, upon the detection of the vehicle event, the low-power mode comprising an energy reserve conservation mode, in which the transmitter does not relay the message; and
         placing the communication module in an active mode, in which the communication module monitors the vehicle communication bus and relays the event-related message, and in which the transmitter relays the event-related message, after the communication module has been in the low-power mode for a predetermined amount of time, such that:
            the communication module is unable to relay the event-related message from the vehicle module regarding the vehicle event while the communication module is in the first mode; and
            the communication module is configured to relay the event-related message from the vehicle module regarding the vehicle event while the communication module is in the second mode.

18. The vehicle of claim 17, wherein:
   the vehicle comprises a battery;
   the detection unit comprises a sensor configured to measure a voltage of the battery over time; and
   the processor is configured to at least facilitate:
      determining if a sudden voltage drop has occurred based on the voltage of the battery over time; and
      placing the communication module in the low-power mode upon the detection that the sudden voltage drop has occurred.

19. The vehicle of claim 17, wherein:
   the vehicle module comprises a vehicle airbag module;
   the processor is configure to at least facilitate:
      upon the detection of a vehicle collision event, placing the communication module in the low-power mode, in which the communication module cannot relay event-related messages, but in which the communication module stores power to relay, at a future point in time, an event-related vehicle collision message from the airbag module regarding the vehicle collision event; and
      after the communication module has been in the first mode for a predetermined amount of time, placing the communication module in the active mode, in which the communication module can relay the event-related vehicle collision event message from the airbag module; and
   the communication module is configured to relay the event-related vehicle collision event message from the airbag module after the communication module is placed in the second mode.

20. The vehicle of claim 17, wherein:
the predetermined amount of time corresponds to an expected amount of time that is expected to have elapsed following the vehicle event until a particular one of the event-related messages are first provided on the vehicle communication bus; and the communication module conserves energy while in the first mode such that the communication module maintains a sufficient amount of energy after the predetermined amount of time to relay the one or more event-related messages after the one or more event-related messages are first provided on the vehicle communication bus.

* * * * *